Dec. 18, 1956  W. E. JACOBSON  2,774,321
LIQUID SOLDERING GUN
Filed Sept. 5, 1952
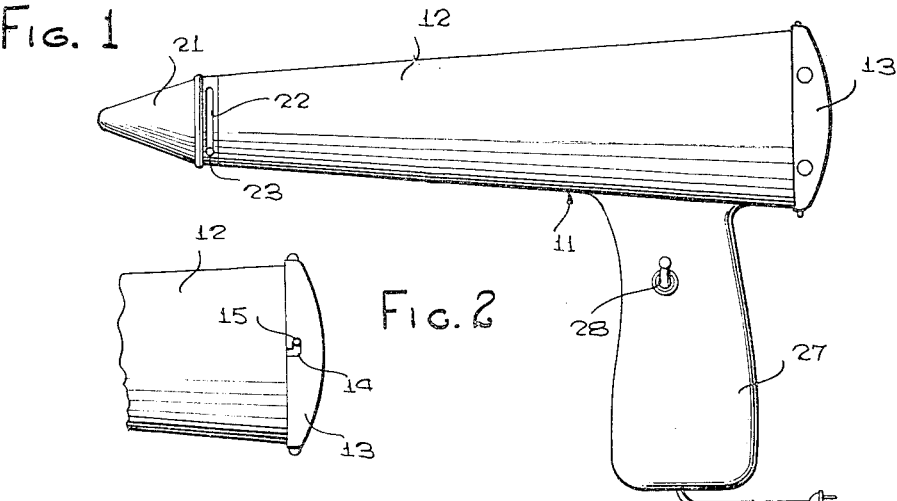
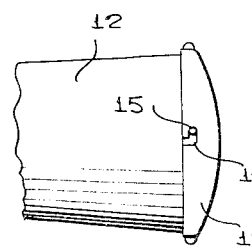
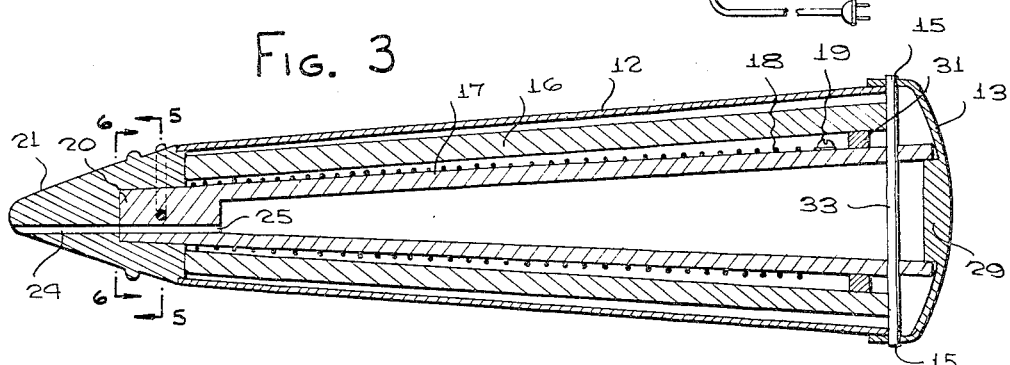
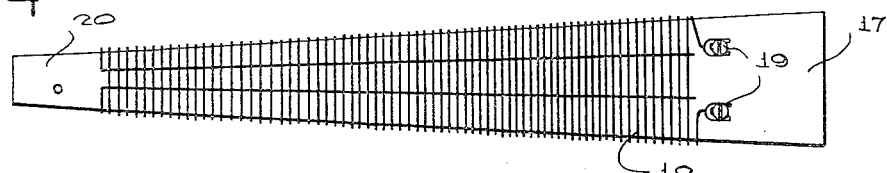
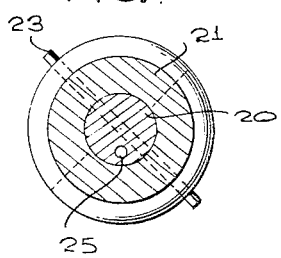
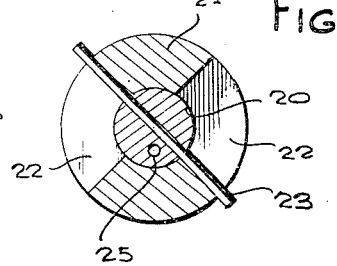
INVENTOR
WILLIAM E. JACOBSON
BY
McMorrow, Berman + Davidson
ATTORNEYS

United States Patent Office 2,774,321
Patented Dec. 18, 1956

2,774,321

LIQUID SOLDERING GUN

William Eino Jacobson, Braintree, Mass.

Application September 5, 1952, Serial No. 308,037

1 Claim. (Cl. 113—93)

This invention relates to soldering tools, and more particularly to an improved soldering gun.

The main object of the invention is to provide a novel and improved soldering gun which is simple in construction, which is easy to use, and which is suitable for use with solder either in stick or bar form or in wire form, or in other desired shape.

A further object of the invention is to provide an improved soldering gun which is inexpensive to manufacture, which is rugged in construction, which is compact in size, and which is easy to manipulate.

Further objects and advantages of the invention will become apparent from the following description and claim, and from the accompanying drawings, wherein:

Figure 1 is a side elevational view of an improved soldering gun constructed in accordance with the present invention.

Figure 2 is a fragmentary top plan view of the rear portion of the main body of the soldering gun of Figure 1 showing the manner in which the end cap is detachably secured to said rear portion.

Figure 3 is a vertical longitudinal cross sectional view taken through the main body of the soldering gun.

Figure 4 is a top plan view of the heating chamber employed in the soldering gun of Figures 1 to 3.

Figure 5 is an enlarged cross sectional detail view taken on the line 5—5 of Figure 3.

Figure 6 is an enlarged cross sectional detail view taken on the line 6—6 of Figure 3.

Referring to the drawings, the illustrated soldering gun is designated generally at 11 and comprises an elongated hollow casing 12 which tapers from its rear end to its forward end and has on its rear end a removable end cap 13, said end cap being formed with diametrically opposed, "bayonet" slots 14 lockingly engageable with radial pins 15 provided on the rear end portion of the casing 12, whereby the end cap 13 may be detachably secured in place. The casing 12 may be formed of suitable material, such as sheet metal. An inner elongated sleeve 16 of suitable refractory material, such as ceramic material or the like, tapers like the casing 12 and is secured in any suitable manner in the casing 12. Designated at 17 is an elongated tapering heating chamber of suitable refractory material, such as porcelain or the like, which has wound thereon the heating coil 18, said coil terminating at the larger end of the chamber 17 in terminals 19 for connection to a suitable electric current source. The heating chamber 17 includes the solid closed end portion 20 which projects forwardly beyond the forward ends of the sleeve 16 and the casing 12, as shown in Figure 3. Rotatably mounted on the end portion 20 of the heating chamber 17 is the metal tip 21, said tip being generally conical in shape, as shown in Figures 1 and 3. and having a socket in its rear end receiving the end portion 20. The metal tip is formed with the opposed slots 22, 22 of substantial circumferential length, as shown in Figure 5, and secured in and extending diametrically through the end portion 20 of the heating chamber 17 is the rod 23 having end portions extending through the slots 22, as shown in Figure 5, and limiting rotation of the tip 21 relative to the heating chamber 17 while mounting the tip in the end portion 20. The tip 21 is formed with the longitudinally extending eccentric discharge passage 24 which is spaced from the axis of said tip, and the end portion 20 of the heating chamber 17 is formed with an eccentric longitudinal passage 25, similarly spaced from the axis of said heating chamber, and being registrable with the passage 24, as shown in Figure 3.

It will be noted from Figure 5 that the pin or rod 23 retains the rotatable tip 21 on the end portion 20 of the heating chamber and allows said tip to be rotated through a substantial angle while preventing the tip from becoming disengaged from said end portion 20. The slots 22 are of a substantial angular size, preferably of the order of 90° in angular extent, allowing a corresponding amount of rotation of the tip 21 relative to the heating chamber 17.

Rigidly secured to the casing 12 is the hollow handle 27, projecting laterally from the casing 12, namely, at an angle of approximately 90° with respect to the longitudinal axis of the casing, and provided with a switch 28 connected in the energizing circuit of the heating coil 18.

In using the device, solder either in bar, wire or pellet form, is introduced into the chamber 17 upon removing the end cap 13 to provide access to the interior of the heating chamber. The end cap 13 is of course replaced after the chamber has been filled with solder. It will be noted from Figure 3 that the end cap 13 is formed with a circular thickened central portion 29 which is sealingly engageable in the larger end of the heating chamber 17 to securely seal said heating chamber. When the heating coil 18 is energized, the solder in the chamber 17 is melted, and at the same time the tip member 21 is heated to a desired temperature. By rotating the tip member 21 to bring the passage 24 into alignment with the passage 25 the melted solder may be allowed to flow out of the tip 21 to be deposited on the surface to be soldered, said surface being simultaneously heated by contact with the tip 21.

The heating chamber 17 is maintained in centered position and is spaced from the inner conical body 16 by a spacer ring 31 of suitable refractory material, such as porcelain or the like, positioned between the heating chamber 17 and the adjacent inside surface of the refractory sleeve 16. Extending through and secured to the larger end of the heating chamber and engaging the rim of the refractory sleeve 16 is the transverse pin or rod 33 whose ends define the locking pins 15, 15 with which the bayonet slots 14 of the cap 13 are lockingly engageable.

While a specific embodiment of an improved soldering tool has been disclosed in the foregoing description, it will be understood that various modifications within the spirit of the invention may occur to those skilled in the art. Therefore it is intended that no limitations be placed on the invention except as defined by the scope of the appended claim.

What is claimed is:

In a soldering tool, an elongated casing having forward and rear ends, a tubular solder reservoir within said casing, said reservoir having a rear end, means closing the rear end of the reservoir, said reservoir having a forward end portion projecting forwardly beyond the forward end of said casing, said forward end portion having a longitudinal eccentric passage extending therethrough, transverse rod means on said end portion, said rod means having ends projecting beyond opposite sides of said end portion, a tip having a socket rotatably receiving said end portion, said tip having circumferentially spaced slots receiving the ends of the rod means, said slots being wider than the ends of the rod means, said tip having a longitudinal eccentric passage therethrough registrable with the passage in the reservoir end portion in one position of rotation of the tip relative to the reservoir.

References Cited in the file of this patent

UNITED STATES PATENTS

| | | |
|---|---|---|
| 981,396 | Downing | Jan. 10, 1911 |
| 1,061,170 | Giffen | May 6, 1913 |
| 1,256,970 | Anderson | Feb. 19, 1918 |
| 1,934,885 | Ring | Nov. 14, 1933 |
| 2,138,992 | Baker | Dec. 6, 1938 |
| 2,159,714 | Serog | May 23, 1939 |
| 2,380,138 | Abramson | July 10, 1945 |
| 2,403,158 | Wertheim et al. | July 2, 1946 |
| 2,458,319 | Uhing | Jan. 4, 1949 |
| 2,564,427 | De Rugeris | Aug. 14, 1951 |
| 2,615,415 | Wertheim et al. | Oct. 28, 1952 |

FOREIGN PATENTS

| | | |
|---|---|---|
| 533,005 | Great Britain | Feb. 5, 1941 |